United States

Domenico

[11] 3,821,216
[45] June 28, 1974

[54] POLYHALO-4-PYRIDINE SULFEN AND SULFONAMIDES

[75] Inventor: Penelope B. Domenico, Danville, Calif.

[73] Assignee: The Dow Chemical Company, Midland, Mich.

[22] Filed: July 10, 1972

[21] Appl. No.: 270,071

Related U.S. Application Data

[63] Continuation-in-part of Ser. No. 861,462, Sept. 26, 1969, abandoned.

[52] U.S. Cl............. 260/247.1, 71/3, 71/92, 71/94, 106/15 R, 162/161, 252/8.8, 252/47.5, 252/106, 252/107, 260/45.8, 260/268 S, 260/293.69, 260/294.8 R

[51] Int. Cl............................................. C07d 31/26

[58] Field of Search........ 260/247.1, 268 S, 293.69, 260/294.8 R

[56] References Cited
OTHER PUBLICATIONS
Banks et al., J. C. S., C(12), 1969, pp. 1,660–1,662, (Received in P.O. Search Center 9–17–60).

*Primary Examiner*—Henry R. Jiles
*Assistant Examiner*—C. M. S. Jaisle
*Attorney, Agent, or Firm*—S. Preston Jones

[57] ABSTRACT

Disclosed are polyhalo-4-pyridine sulfen- and sulfonamides and a method of making them. These compounds are useful as pesticides.

24 Claims, No Drawings

POLYHALO-4-PYRIDINE SULFEN AND SULFONAMIDES

CROSS REFERENCE TO RELATED APPLICATION

This application is a continuation-in-part of my co-pending application Ser. No. 861,462, filed Sept. 26, 1969, now abandoned.

SUMMARY OF THE INVENTION

The present invention is directed to polyhalo-4-pyridine sulfen- and sulfonamides corresponding to the formula

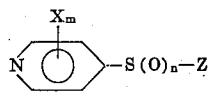

In this and succeeding formulae, X represents bromo, chloro or fluoro; $m$ represents an integer of 2, 3 or 4; $n$ represents an integer of 0 or 2 and Z represents one of A. an amino group of the formula

wherein each R independently represents hydrogen, alkyl, alkenyl, hydroxyalkyl, cyclohexyl, benzyl or phenyl;

B. a morpholino group of the formula

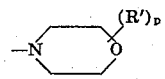

wherein each R' independently represents methyl or ethyl and $p$ represents an integer of 0, 1 or 2;

C. a polymethylene imino group of the formula

wherein $r$ represents an integer of from 2 to 6; or

D. a substituted piperazinyl group of the formula

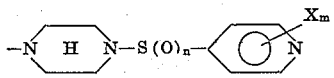

wherein X, $m$, and $n$ are as hereinbefore defined.

The term "alkyl" is employed in the present specification and claims designates either a straight or branched chain alkyl radical containing from one to about 20 carbon atoms. The term "alkenyl" as employed in the present specification and claims designates either a straight or branched chain alkenyl radical of from three to about 20 carbon atoms. The term "hydroxyalkyl" as employed in the present specification and claims designates hydroxyalkyl radicals of from one to five carbon atoms, inclusive.

The sulfenamides and sulfonamides of the present invention are crystalline solids or oils which are of low solubility in water and of moderate solubility in common organic solvents. These compounds are useful as pesticides for the control of various pests such as insects, bacteria, fungi, nematodes and plants.

The new compounds of the present invention are prepared by reacting either a polyhalo-4-pyridine sulfenyl chloride, fluoride or bromide or a polyhalo-4-pyridine sulfonyl chloride, fluoride or bromide with an amino compound containing a reactive hydrogen (generally represented by the symbol

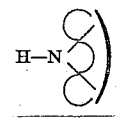

said amino compound corresponding to one of the formulas

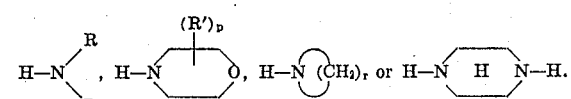

The reaction can be characterized as follows:

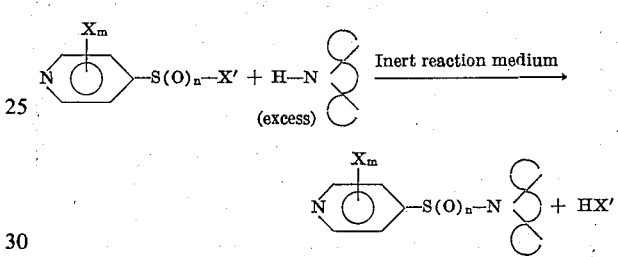

wherein X' represents chloro, bromo or fluoro.

The reaction is conveniently carried out by contacting the reactants in the presence of an inert liquid reaction medium. The reaction takes place smoothly at temperatures between about 25° and about 80°C, and preferably at ambient conditions of temperature and pressure.

Inert liquids which are suitable as reaction media include benzene, hexane and carbon tetrachloride.

In many instances, the starting polyhalo-4-pyridine sulfenyl halide or polyhalo-4-pyridine sulfonyl halide reactants may conveniently be prepared and the amino compound reactant added directly to the reaction mixture without a separation or purification step. In such instances, the polyhalo-4-pyridine sulfenyl halide is prepared by slowly adding the appropriate polyhalo-4-pyridine mercaptan to an agitated halogen saturated carbon tetrachloride solution. After a short reaction period, the carbon tetrachloride is reduced to about one-half volume by distillation or other conventional procedure and the amino compound is slowly added thereto. The reaction is allowed to proceed as hereinafter set forth. The polyhalo-4-pyridine sulfonyl halide is conveniently prepared by oxidizing the polyhalo-4-pyridine sulfenyl halide (prepared as above) with chlorine or bromine water in the presence of a solvent such as carbon tetrachloride, trichloroacetic acid or water. If the polyhalo-4-pyridine sulfonyl fluoride is the desired starting material, it can be prepared by conventional halogen exchange. Further details on these preparative procedures are found in U.S. Pat. No. 3,635,994. Thereafter, the amino compound is slowly added to the reaction mixture and the reaction is allowed to proceed as hereinafter set forth.

The amounts of the reactants to be employed are not critical, some of the desired product compound being obtained when employing any amount. The reaction consumes the reactants in amounts representing equimolecular proportions of the sulfenyl halide or sulfonyl halide to amino compound. However, since the amino compound can and often does act as a hydrogen halide acceptor, the use of excess amino compound is preferred.

In carrying out the reaction, the reactants are contacted together in any convenient fashion. Some of the desired product is formed immediately upon the contacting together of the reactants. However, the yield of the desired product is increased by permitting the reaction mixture to stand for a period of time, up to 7 hours, preferably with agitation of the mixture. Following the reaction period, the hydrogen halide salt is removed by filtration, decantation or centrifugation or other conventional separatory procedure. The inert liquid reaction medium is removed by evaporation under subatmospheric pressure leaving the desired product as a crude residue. The product so obtained can be used without purification or can be purified by conventional procedures. For example, the crude residue product can be mixed with a quantity of any of the inert liquids employed as the reaction medium and the resulting mixture filtered to separate insoluble by-product materials and the inert liquid removed from the filtered mixture by evaporation under subatmospheric pressure to obtain the purified product. Also, in the instance of those products which are solids, the crude residue product can be purified by recrystallization.

DESCRIPTION OF SOME PREFERRED EMBODIMENTS

The following examples illustrate the present invention and the manner by which it can be practiced but, as such, should not be construed as limitations upon the overall scope of the same.

EXAMPLE 1

N,N-Diethyl-2,3,5,6-tetrachloro-4-pyridine sulfenamide

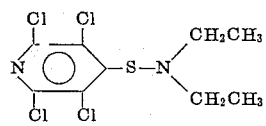

To an agitated solution of 600 milliliters of chlorine saturated carbon tetrachloride was slowly added 25 grams (0.1 mole) of tetrachloro-4-pyridine mercaptan. After the addition was complete, the carbon tetrachloride was reduced to about one-half volume by aspiration and 14.6 grams (0.2 moles) of diethylamine was slowly added to the agitated reaction mixture. After addition of the amine was complete, the reaction mixture was agitated an additional 15 minutes and allowed to stand undisturbed for about 30 minutes. The reaction mixture was filtered to remove the amine-hydrogen chloride salt present and the solvent removed by aspiration to yield 29.50 grams (92.5 percent of theory) of N,N-diethyl-2,3,5,6-tetrachloro-4-pyridine sulfenamide. The product was found by analysis to have carbon, hydrogen, chlorine, nitrogen and sulfur contents of 33.75, 3.43, 44.42, 8.48 and 9.96 percent, respectively, as compared to the theoretical contents of 33.80, 3.15, 44.30, 8.72 and 10.00 percent, respectively calculated for the named structure.

EXAMPLE 2

N-Butyl-2,3,5,6-tetrachloro-4-pyridine sulfenamide

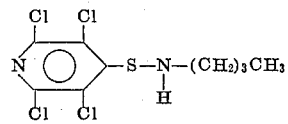

To an agitated solution of 10 grams (0.04 mole) of tetrachloro-4-pyridine sulfenyl chloride dissolved in 42 milliliters of carbon tetrachloride was slowly added 5.2 grams (0.07 moles) of n-butyl amine. The reaction mixture was filtered to remove the butyl amine-hydrogen chloride salt and distilled to remove the solvent. The residue was added to 50 milliliters of hexane and the mixture distilled to remove the hexane and recover 11.1 grams (97.2 percent of theory) of N-butyl-2,3,5,6-tetrachloro-4-pyridine sulfenamide as a liquid. The product was found by analysis to have carbon, hydrogen, chlorine, nitrogen and sulfur contents of 35.44, 2.80, 43.04, 8.25 and 9.60 percent, respectively, as compared to the theoretical contents of 33.80, 3.14, 44.20, 8.75 and 10.00 percent, respectively, calculated for the named structure.

EXAMPLE 3

N-(2-Hydroxyethyl)-2,3,5,6-tetrachloro-4-pyridine sulfenamide

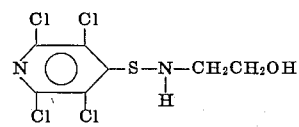

To an agitated solution of 2.2 grams (0.2 mole) of ethanolamine dissolved in 50 milliliters of benzene at 40°C was slowly added dropwise, 5.0 grams (0.2 mole) of tetrachloro-4-pyridine sulfenyl chloride. The reaction mixture was maintained for 2 hours and filtered to remove the insoluble ethanol amine-hydrogen chloride salt. The solvent was removed by distillation and the residue mixed with 50 milliliters of dichloromethane. The solvent was removed leaving the crystalline N-(2-hydroxyethyl)-2,3,5,6-tetrachloro-4-pyridine sulfenamide product. The product melted at 168°–170°C and was found by analysis to have carbon, hydrogen, chlorine, nitrogen and sulfur contents of 26.91, 2.32, 45.38, 8.66 and 10.09 percent, respectively, as compared with the theoretical contents of 27.30, 1.96, 46.00, 9.09 and 10.39 percent, respectively, calculated for the named structure.

EXAMPLE 4

2,3,5,6-Tetrachloro-4-pyridine sulfonamide

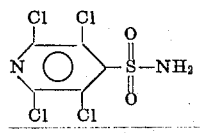

To an agitated solution of 80 milliliters of ammonium hydroxide dissolved in 80 milliliters of water was added dropwise 10 grams (0.03 mole) of tetrachloro-4-pyridine sulfonyl chloride. The reaction mixture was maintained at room temperature under agitation for 90 minutes and filtered to remove a white solid which was added to hot benzene and the insoluble salts formed were removed by filtration. The benzene solution was dried with sodium sulfate and filtered to remove the remaining insoluble salts. The benzene solution was slightly cooled and filtered to recover the 2,3,5,6-tetrachloro-4-pyridine sulfonamide product. The product was found by analysis to have carbon, hydrogen, chlorine, nitrogen and sulfur contents of 21.22, 0.82, 46.88, 8.42 and 10.15 percent, respectively, as compared with the theoretical contents of 20.28, 0.68, 47.90, 9.47 and 10.82 percent, respectively, calculated for the named structure.

EXAMPLE 5

1-[(2,3,5,6-Tetrachloro-4-pyridyl)sulfonyl] piperidine

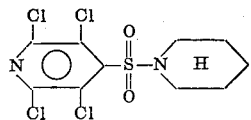

To a well agitated solution of 15 grams (0.05 mole) of tetrachloro-4-pyridine sulfonyl chloride dissolved in ~75 milliliters of carbon tetrachloride was slowly added 8.1 grams (0.10 mole) of piperidine. The mixture was maintained under agitation for 2½ hours and filtered to remove piperidine-hydrogen chloride salt. The mixture was cooled and filtered to remove the crude 1-[(2,3,5,6-tetrachloro-4-pyridyl)sulfonyl]-piperidine product. The product was crystallized from hexane, dried and found to melt at 160°–162°C. By analysis, it is found to have carbon, hydrogen, chlorine, nitrogen and sulfur contents of 33.05, 2.71, 38.74, 7.75 and 8.76 percent, respectively, as compared with the theoretical contents of 33.00, 2.75, 38.92, 7.70 and 8.81 percent, respectively, calculated for the named structure.

EXAMPLE 6

N,N-Diallyl-2,3,5,6-tetrachloro-4-pyridine sulfonamide

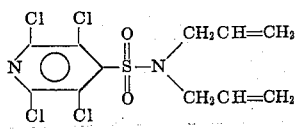

To an agitated solution of 10 grams (0.03 mole) of tetrachloro-4-pyridine sulfonyl chloride in 50 milliliters of carbon tetrachloride was slowly added a solution of 6.12 grams (0.063 mole) of diallyl amine in 75 milliliters of carbon tetrachloride. The resulting exotherm raised the temperature of the mixture from room temperature to 70°C. Thereafter, the mixture was refluxed at 76°C for about 20 minutes and cooled. The granular brownish precipitate which formed upon cooling was recovered by filtration and washed with carbon tetrachloride followed by a wash with hexane. The liquid phases were combined and the solvent removed by vacuum stripping leaving an amber oil residue. This residue was taken up in hexane and the N,N-diallyl-2,3,5,6-tetrachloro-4-pyridine sulfonamide was recovered by filtration as a light tan, fluffy solid in a yield of 5.50 grams (46.2 percent of theory). The product was found to melt at 61°C. Upon analysis, the product was found to have carbon, hydrogen, chlorine, nitrogen and sulfur contents of 35.37, 2.63, 37.66, 7.22, and 8.51 percent, respectively, as compared with the theoretical contents of 35.10, 2.66, 37.70, 7.45, and 8.53 percent respectively, calculated for the named structure.

The following compounds of the present invention are prepared in accordance with the methods herein set forth.

N,N-Diethyl-2,3,5,6-tetrachloro-4-pyridine sulfonamide, having a melting point of 75°–80°C.

N-Butyl-2,3,5,6-tetrachloro-4-pyridine sulfonamide, having a melting point of 103°C.

N-Methyl-2,3,5,6-tetrachloro-4-pyridine sulfonamide, having a molecular weight of ~308.

N,N-Diphenyl-2,3,5,6-tetrafluoro-4-pyridine sulfonamide, having a molecular weight of ~272.

N,N-Diethyl-2,6-difluoro-4-pyridine sulfenamide, having a molecular weight of ~218.

N,N-diethyl-2,6-dichloro-4-pyridine sulfonamide, having a molecular weight of ~282.

Hexahydro-1-(2,6-dichloro-4-pyridyl sulfonyl)-1H-azepine, having a molecular weight of ~295.

4-[(2,3,5,6-Tetrachloro-4-pyridyl)thio]-3-methyl morpholine, having a molecular weight of ~376.

1,4-Bis[(2,3,5,6-tetrachloro-4-pyridyl)thio]-piperazine, having a melting point of 203°C.

4-[(2,3,5,6-Tetrabromo-4-pyridyl)thio]morpholine, having a molecular weight of ~510.

N-Decyl-2,3,5-trichloro-4-pyridine sulfonamide, having a molecular weight of ~401.

4-[(2,3,5,6-Tetrachloro-4-pyridyl)thio]morpholine, having a melting point of 107.5°C.

N,N-Dibutenyl-2,3,5,6-tetrachloro-4-pyridine sulfenamide, having a molecular weight of ~374.

1-[(2,3,5,6-Tetrachloro-4-pyridly)sulfonyl]aziridine, having a molecular weight of ~320.

N,N-Bis(4-hydroxybutyl)-2,3,5,6-tetrachloro-4-pyridine sulfonamide, having a molecular weight of ~440.

4-[(2,6-Dibromo-4-pyridly)sulfonyl[-2,6-diethyl morpholine, having a molecular weight of ~442.

2,3,5,6-Tetrachloro-4-pyridine sulfenanilide, having a melting point of 113°C.

2,3,5,6-Tetrachloro-4-pyridine sulfonanilide, having a melting point of 127°C.

N-Butoxy-N-butyl-2,3,5-trichloro-4-pyridine sulfonamide, having a molecular weight of ~389.

N-Eicosyl-2,3,5,6-tetrachloro-4-pyridine sulfonamide, having a molecular weight of ~576.

N-Benzyl-2,3,5,6-tetrachloro-4-pyridine sulfenamide, having a molecular weight of ~352.

N-Amyl-2,3,5,6-tetrabromo-4-pyridine sulfenamide, having a molecular weight of ~544.

N,N-Dicyclohexyl-2,3,5,6-tetrachloro-4-pyridine sulfenamide, having a molecular weight of ~426.

1-[(2,3,5,6-Tetrachloro-4-pyridyl)thio]piperidine, having a melting point of 74°C.

1,4-Bis[(2,6-dichloro-4-pyridyl)thio]piperazine, having a molecular weight of ~340.

In accordance with the present invention, it has been discovered that the polyhalo-4-pyridine sulfen- and sulfonamide compounds can be employed as pesticides for the control of many bacterial, terrestrial and aquatic plants, fungal nematode and insect pests. They can be applied to the aerial portions of many growing plants to control leaf-attacking fungal organisms or dispersed in soil or applied to plant seeds to control the root and seed attacking organisms of mold and damping off. In still other operations they can be applied to orchard floor surfaces to control over-wintering spores of many fungal organisms. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles, cellulosic materials or in grain or can be employed in the impregnation of wood and lumber to preserve and protect such products from the attack of the organisms of rot, mold and decay. They also can be employed as a toxicant to control insect pests.

The exact concentration of the toxicant to be employed in the treating compositions is not critical and may vary considerably provided the required dosage of the effective agent is supplied in the ink, adhesive, soap, cutting oil, polymeric material, paint, textile, paper, wood or growth medium or upon plant foliage or insects. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a foliar spray or in seed treatment, it is often convenient to apply the compounds as wettable powders.

In a representative operation, each of the compounds 4-[(2,3,5,6-tetrachloro-4-pyridyl)thio]morpholine, N-butyl-2,3,5,6-tetrachloro-4-pyridine sulfonamide, 1,4-bis[(2,3,5,6-tetrachloro-4-pyridyl)thio]piperazine, N,N-diethyl-2,3,5,6-tetrachloro-4-pyridine sulfenamide, 1-[(-2,3,5,6-tetrachloro-4-pyridyl)thio]piperidine and N,N-diethyl-2,3,5,6-tetrachloro-4-pyridine sulfonamide, when employed as the sole toxicant in a nutrient agar at a concentration of about 500 parts by weight of the compound per million parts of agar, is found to give 100 percent kill and control of the organism Staphylococcus aureus. The compounds N,N-diallyl-2,3,5,6-tetrachloro-4-pyridine sulfonamide, 4-[(2,3,5,6-tetrachloro-4-pyridyl)thio]morpholine, N-butyl-2,3,5,6-tetrachloro-4-pyridinesulfonamide, 1,4-bis[(2,3,5,6-tetrachloro-4-pyridyl)thio]piperazine and N,N-diethyl-2,3,5,6-tetrachloro-4-pyridine sulfonamide, when employed at the same toxicant concentration and nutrient agar, give 100 percent kill and control of the organism Trichophyton mentagrophytes. In each of the above determinations, a check nutrient agar containing no toxicant, supports a heavy growth of the test organisms.

In an additional operation, N,N-diethyl-2,3,5,6-tetrachloro-4-pyridine sulfonamide, 4-[(2,3,5,6-tetrachloro-4-pyridyl)thio]morpholine, 1,4-bis[(2,3,5,6-tetrachloro-4-pyridyl)thio]piperazine, and N,N-diethyl-2,3,5,6-tetrachloro-4-pyridine sulfenamide are found to give 100 percent kill and control of the organism Bacillus subtilis when employed at the same toxicant concentration and nutrient agar. 4-[(2,3,5,6-Tetrachloro-4-pyridyl)thio]morpholine and 1,4-bis[(2,3,5,6-tetrachloro-4-pyridyl)thio]-piperazine are also found to give 100 percent kill and control of the organism Mycobacterium phlei when employed at the same toxicant concentration and nutrient agar. 1-[(2,3,5,6-Tetrachloro-4-pyridyl)thio]piperidine is also found to give 100 percent kill and control of the organisms Salmonella typhosa, Pullularia pullulans and Rhizopus nigricans. In each of the above determinations, the toxicant concentration and nutrient agar are as above and in each, the check nutrient agar supports a heavy growth of the test organisms.

In another representative operation, 2,3,5,6-tetrachloro-4-pyridine sulfenanilide, when employed as the sole toxic constituent in an aqueous composition at a concentration of 10 parts per million by weight of the ultimate compositions, gives substantially complete kills of the water plants Elodea, Cabomba and Moneywort. In other operations, N,N-diethyl-2,3,5,6-tetrachloro-4-pyridine sulfenamide, N,N-diethyl-2,3,5,6-tetrachloro-4-pyridine sulfonamide, N,N-diallyl-2,3,5,6-tetrachloro-4-pyridine sulfonamide and N-butyl-2,3,5,6-tetrachloro-4-pyridine sulfonamide, each when employed as the sole toxicant constituent in aqueous compositions and at a concentration of 100 parts per million by weight of the ultimate composition, give 100 percent kill and control of rice blast.

In another operation, 1-[(2,3,5,6-tetrachloro-4-pyridyl)thio]piperidine, when employed as the sole toxic constituent in an aqueous dispersion at a concentration of 25 parts per million by weight of the ultimate dispersion, when applied to soil infested with root-knot nematodes and then planted with cucumbers, gives 100 percent control of the nematodes.

In another representative operation, aqueous dispersions of 4-[(2,3,5,6-tetrachloro-4-pyridyl)thio]morpholine at a concentration of 400 parts per million by weight, give substantially complete kills of rice blast, tomato late blight, apple scab fungus and downey mildew. In a similar operation, N,N-diethyl-2,3,5,6-tetrachloro-4-pyridine sulfenamide as the sole toxicant in an aqueous dispersion at a concentration of 100 parts per million by weight of the ultimate dispersion gives 100 percent kill of potato scab fungus and fire blight bacterium.

In other representative operations, 4-[(2,3,5,6-tetrachloro-4-pyridyl)thio]morpholine, when employed as the sole toxicant in an aqueous composition at a concentration of 5 parts per million by weight of the ultimate composition, give 100 percent kill of yellow fever mosquito larvae. N,N-Diallyl-2,3,5,6-tetrachloro-4-pyridine sulfonamide, when employed as the sole toxicant in an aqueous composition at a concentration of 500 parts per million by weight of the ultimate composition, gives substantially complete kill of American cockroach. N-Butyl-2,3,5,6-tetrachloro-4- pyridine sulfonamide, when employed as the sole toxicant in an aqueous composition at a concentration of 2 parts per million by weight of the ultimate composition, gives 100 percent kill of daphnia and ram's horn snail.

In other operations, aqueous compositions of one of the compounds 2,3,5,6-tetrachloro-4-pyridine sulfenanilide, N,N-diethyl-2,3,5,6-tetrachloro-4-pyridine sulfenamide and N-butyl-2,3,5,6-tetrachloro-4-pyridine sulfenamide as the only active toxicant at a concentration of 50 pounds per acre give 100 percent kill and control of wild oats. Aqueous compositions of one of 1-[(2,3,5,6-tetrachloro-4-pyridyl)sulfonyl]-piperidine or N,N-diethyl-2,3,5,6-tetrachloro-4-pyridine sulfonamide as the sole toxicant at a concentration of 10 pounds per acre give substantially complete kill and control of pigweeds. In other operations, aqueous compositions of one of N-butyl-2,3,5,6-tetrachloro-4-pyridine sulfonamide, 2,3,5,6-tetrachloro-4-pyridine sulfenanilide, N,N-diethyl-2,3,5,6-tetrachloro-4-pyridine sulfenamide or N-butyl-2,3,5,6-tetrachloro-4-pyridine sulfenamide as the only active toxicant at a concentration of 4,000 parts per million by weight of the composition give substantially complete kill and control of crabgrass.

In other operations, an aqueous composition containing N,N-diethyl-2,3,5,6-tetrachloro-4-pyridine sulfenamide as the sole active toxicant and at a concentration of 4,000 parts per million by weight of the ultimate composition gives substantially complete kill and control of pigweeds, tomato, corn and bean mildew. In other operations, aqueous compositions of one of N,N-diethyl-2,3,5,6-tetrachloro-4-pyridine sulfenamide, N,N-diethyl-2,3,5,6-tetrachloro-4-pyridine sulfonamide or N-butyl-2,3,5,6-tetrachloro-4-pyridine sulfenamide as the sole active toxicant and at a concentration of 50 pounds per acre give substantially complete kill and control of wheat.

When applied at a dosage level of from about 0.001 to about 10,000 parts per million, each of the compounds of the present invention, the utility of which is not specifically recited hereinabove, has the ability to kill, inhibit or otherwise control one or more of the above said or other fungal, bacterial, nematode, insect or plant pests.

PREPARATION OF STARTING MATERIALS

The amino compounds employed as starting materials are commercial compounds. Also, these can be prepared as taught by Wertheim "Organic Chemistry" 1951, pages 344–356 and Wagner et al. "Synthetic Organic Chemistry" 1953, pages 654–727, by a variety of methods. For example, the alkyl, phenyl, benzyl and cyclohexyl amines are prepared by hydrogenation of the corresponding nitriles, usually in the presence of acetic anhydride and a platinum catalyst or ammonia and a nickel catalyst.

The alkyl amines can also be prepared by ammonation of alkyl halides with ammonia.

The unsaturated amines are prepared by the hydrolysis of the corresponding isocyanate or by dehydrohalogenation of the corresponding haloamine.

The morpholine compounds are conventionally prepared by the dehydration of the corresponding diethanol amine.

The hydroxy-substituted amines can be prepared in a method similar to that taught in U.S. Pat. No. 1,904,013 wherein an alkylene oxide is reacted with aqueous ammonia at temperatures of about 0° to about 100°C. They can also be prepared by the reduction of the corresponding nitro alcohol with iron powder and a mineral acid as taught by Senkus, Ind. Eng. Chem., 40, page 506 (1948).

What is claimed is:

1. Compound corresponding to the formula

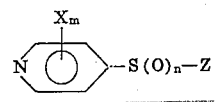

wherein X represents bromo, chloro or fluoro; $m$ represents an integer of 2, 3 or 4; $n$ represents an integer of 0 or 2 and Z represents one of A. an amino group of the formula

wherein each R independently represents hydrogen, alkyl of from one to about 20 carbon atoms, alkenyl of from 3 to about 20 carbon atoms, hydroxyalkyl of from one to five carbon atoms, cyclohexyl, benzyl or phenyl;

B. a morpholino group of the formula

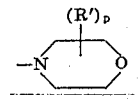

wherein each R' independently represents methyl or ethyl and $p$ represents an integer of 0, 1 or 2;

C. a polymethylene imino group of the formula

wherein $r$ represents an integer of from 2 to 6 with the proviso that when X is fluoro, $r$ is other than 5; or D. a 4-[(polyhalo-4-pyridyl)sulfenyl- or sulfonyl]-1-piperazinyl group of the formula

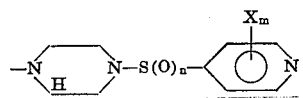

wherein X, m and n are as hereinbefore defined.

2. The compound of claim 1 which corresponds to the formula

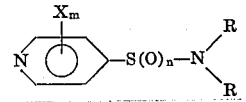

wherein X, $m$, $n$ and R are as hereinabove defined.

3. The compound of claim 2 wherein X is chlorine.

4. The compound of claim 3 wherein *n* is 0.

5. The compound of claim 4 which is N,N-diethyl-2,3,5,6-tetrachloro-4-pyridine sulfenamide.

6. The compound of claim 4 which is N-butyl-2,3,5,6-tetrachloro-4-pyridine sulfenamide.

7. The compound of claim 4 which is N-(2-hydroxyethyl)-2,3,5,6-tetrachloro-4-pyridine sulfenamide.

8. The compound of claim 4 which is 2,3,5,6-tetrachloro-4-pyridine sulfenanilide.

9. The compound of claim 3 wherein *n* is 2.

10. The compound of claim 9 which is 2,3,5,6-tetrachloro-4-pyridine sulfonamide.

11. The compound of claim 9 which is N,N-diallyl-2,3,5,6-tetrachloro-4-pyridine sulfonamide.

12. The compound of claim 9 which is N,N-diethyl-2,3,5,6-tetrachloro-4-pyridine sulfonamide.

13. The compound of claim 9 which is 2,3,5,6-tetrachloro-4-pyridine sulfonanilide.

14. The compound of claim 1 which corresponds to the formula

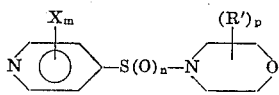

wherein X, *m*, *n*, R' and p are as hereinbefore defined.

15. The compound of claim 14 wherein each X is chlorine.

16. The compound of claim 15 wherein *p* is 0.

17. The compound of claim 16 which is 4-[(2,3,5,6-tetrachloro-4-pyridyl)thio]morpholine.

18. The compound of claim 1 which corresponds to the formula

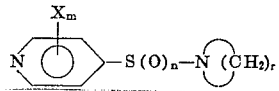

wherein X, *m*, *n*, and *r* are as hereinbefore defined.

19. The compound of claim 18 wherein each X is chlorine.

20. The compound of claim 19 which is 1-[(2,3,5,6-tetrachloro-4-pyridyl)thio]piperidine.

21. The compound of claim 19 which is 1-[(2,3,5,6-tetrachloro-4-pyridyl)sulfonyl]piperidine.

22. The compound of claim 1 corresponding to the formula

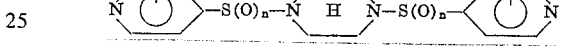

wherein X, *m* and *n* are as hereinbefore defined.

23. The compound of claim 22 wherein each X is chlorine.

24. The compound of claim 23 which is 1,4-bis[(2,3,5,6-tetrachloro-4-pyridyl)thio]piperazine.

* * * * *